United States Patent [19]
Gezarzick et al.

[11] Patent Number: 6,140,625
[45] Date of Patent: Oct. 31, 2000

[54] DEVICE FOR ROTATING AND SIMULTANEOUS HARDENING BY ELECTRIC INDUCTION

[75] Inventors: Waldemar Gezarzick; Axel Von Starck, both of Remscheid, Germany

[73] Assignee: Elotherm GmbH, Remscheid, Germany

[21] Appl. No.: 09/242,375

[22] PCT Filed: Jul. 3, 1997

[86] PCT No.: PCT/EP97/03507

§ 371 Date: Apr. 12, 1999

§ 102(e) Date: Apr. 12, 1999

[87] PCT Pub. No.: WO98/12900

PCT Pub. Date: Mar. 26, 1998

[30] Foreign Application Priority Data

Sep. 18, 1996 [DE] Germany .......................... 196 38 008

[51] Int. Cl.[7] .................................. H05B 6/14; H05B 6/40
[52] U.S. Cl. ......................... 219/639; 219/640; 219/652; 219/673; 266/129; 148/572
[58] Field of Search ........................... 219/640, 635, 219/642, 647, 652, 672, 676, 673, 639; 266/129; 148/573, 572

[56] References Cited

U.S. PATENT DOCUMENTS

| | | | |
|---|---|---|---|
| 3,967,089 | 6/1976 | Seulen et al. ............................. | 219/639 |
| 5,157,231 | 10/1992 | Baeuerle et al. . | |
| 5,451,749 | 9/1995 | Griebel et al. . | |
| 5,796,078 | 8/1998 | Ottenwaelder et al. ................ | 219/639 |

FOREIGN PATENT DOCUMENTS

| | | |
|---|---|---|
| 1 125 965 | 11/1956 | France . |
| 36 17 468 | 1/1987 | Germany . |
| 40 01 887 A1 | 7/1991 | Germany . |

Primary Examiner—Philip H. Leung
Attorney, Agent, or Firm—Proskauer Rose LLP

[57] ABSTRACT

The invention relates to the rotary and simultaneous electroinductive hardening of the bearing surfaces (2a; 3a) of crank pins (2; 3) of a crankshaft (1) disposed immediately one beside the other and offset in relation to one another in the axial direction (D), having inductors (10; 11) which each engage around the crank pins (2; 3) by a maximum of 180° and which each have two inductor branches (12, 13; 14, 15) arranged in parallel and following the curvature of the bearing surfaces (2a; 3a), of which one branch is associated with the overlapping zone (5) of the crank pins (2; 3), the other branch being associated with the particular other edge zone (2b; 3b) of the crank pin (2; 3) associated therewith, the inductor branches (12, 13; 14, 15) of each inductor (10; 11) having in the axial direction (D) a distance (A) increased in relation to half the total width (B) of the crank pins (2; 3). According to the invention such a device is characterised in that the inductors (10; 11) engage around the crank pins (2; 3) substantially from the same direction (R) and the zone of increased distance (A) of the inductor branches (12, 13; 14, 15) of each inductor (10; 11) is limited to that portion (12c; 14c) of the inductor branch (12; 14) associated with the overlapping zone (5) which does not in any rotary position of the crankshaft (1) penetrate the corresponding portion (14c; 12c) of the inductor branch (14; 12) of the particular other inductor (11; 10) associated with the overlapping zone (5).

8 Claims, 3 Drawing Sheets

DEVICE FOR ROTATING AND SIMULTANEOUS HARDENING BY ELECTRIC INDUCTION

BACKGROUND OF THE INVENTION

The invention relates to a device for the rotary and simultaneous electroinductive hardening of the bearing surfaces of crank pins of a crankshaft disposed immediately one beside the other and offset in relation to one another in the axial direction, having inductors which each engage around the crank pins by a maximum of 180° and which each have two inductor branches arranged in parallel and following the curvature of the bearing surfaces, of which one branch is associated with the overlapping zone of the crank pins, the other branch being associated with the particular other edge zone of the crank pin associated therewith, the inductor branches of each inductor having in the axial direction a distance increased in relation to half the total width of the crank pins.

In crankshafts having crank pins disposed offset immediately one beside the other, also known by the term "split pin crankshafts", there is the basic problem that with the individual hardening of each bearing surface the previously hardened immediately adjacent bearing surface is annealed by the heating of the following hardened bearing surface. For this reason, for example, German Patent Specification DE 42 36 921 C1 suggests that the hardening of the immediately adjacent bearing surface of a split pin crankshaft should be performed simultaneously. Associated with each crank pin is an inductor, the inductors being disposed substantially diametrically opposite. This diametrically opposite, offset arrangement has the advantage that the space available on both sides of the crankshaft can be used for the arrangement of supply and control devices for the operation of the inductors. Another advantage of the diametrically opposite arrangement of the inductors is that it enables the width of the individual inductors—i.e., the distance between the inductor branches—to be so selected that the sum of the width of two inductors is greater than the total width of two bearing surfaces to be hardened. The radially opposite arrangement ensures that even though they overlap in the axial direction because of the increased width, the inductors do not collide when the crankshaft rotates.

Another problem in the electroinductive hardening of immediately adjacent bearing surfaces of a crankshaft is that as a rule cheeks are formed which are constructed laterally of the crank pins disposed directly one beside the other and which cheeks have a larger volume of material than the crank pins disposed therebetween.

When the bearing surfaces become heated, the accumulation of material in the zone of the cheeks results in a reduction in heat in the zone of the bearing surface edge zones associated with the cheeks. To obviate this problem German Patent Application 195 30 430 suggests that the inductor branch associated with the cheek side edge zone of the bearing surface to be hardened should be constructed longer than the inductor branch disposed in the overlapping area of the crank pins. This achieves a uniform temperature distribution in the electroinductive heating of bearing surfaces.

The afore-explained devices have proved themselves in practical trials, but it has been found that it is technically very expensive so to guide the diametrically opposite inductors and keep them bearing against the bearing surface to be hardened that on the one hand any damage to the bearing surface is impossible, while on the other hand the close electroinductive coupling of the inductor and the bearing surface is ensured necessary for the effective heating of the bearing surface.

Neither could the cost of guiding the inductors be reduced by the rearrangement of the electric supply elements, as also known from practice, to enable the inductor casings to be jointly brought in from one direction from above. Even with inductors thus supplied from above, each of the inductor branches operative during heat generation had to be disposed substantially diametrically opposite, to prevent them from colliding when the crankshaft rotated.

It is an object of the invention to provide a device of the kind specified in which the technical cost of guiding the inductors is reduced, while at the same time an optimum heating and hardening result is ensured.

SUMMARY OF THE INVENTION

This problem is solved according to the invention by the features that, the inductors engage around the crank pins substantially from the same direction, and the zone of increased distance of the inductor branches of each inductor is limited to that portion of the inductor branch associated with the overlapping : zone which does not in any rotary position of the crankshaft penetrate or brush over the corresponding portion of the inductor branch of the particular other inductor associated with the overlapping zone.

According to the invention the inductor branches engage around their associated bearing surfaces from the same direction. This means that the inductor branches operative for heating are advanced jointly with the inductor casing from one direction to the bearing surface to be hardened and, disposed immediately adjacent, engage from the same direction around the bearing surfaces when placed thereon. This eliminates expensive mechanisms for applying diametrically opposite inductor branches to the bearing surface. At the same time the inductors' own weight can be used to generate the force necessary for the proper fitting of the inductors on to the bearing surfaces, while the actual force applied can be metered by simple means, for example, by resilient elements.

Since according to the invention the branches of each inductor have only over a certain portion a distance increased in relation to the width of the bearing surface to be hardening, the inductors are reliably prevented from colliding when the crank shaft rotates, even though they are disposed lying closing adjacent one beside the other. At the same time, the limits of the portion of increased distance—i.e., the zone in which the inductor branches overlap in the axial direction—is fixed by the ends of that portion of the inductor branch associated with the overlapping zone between which and the corresponding portion of the inductor branch of the other inductor associated with the overlapping zone no meeting takes place, viewed in the axial direction of the crankshaft, during a rotation.

The limitation of the zone in which the inductor branches of the! inductors associated with the overlapping zone of the crank pins overlap one another in the axial zone of the crankshaft not only enables the inductors to act on the bearing surfaces from the same direction without any risk of collision. Such limitation also allows for the fact that the heat supplied to the overlapping zone must be lower than the quantity of heat which must be supplied to the other edge zone of the bearing surface, which is as a rule associated with a cheek. In this way the inductor construction according to the invention can reliably prevent damage due to the overheating of the bearing surfaces to be hardened.

In addition, the demand that different quantities of heat should be introduced into the various zones of the bearing surface to be hardened is met by the feature that the inductor branch associated with the overlapping zone is shorter than the other inductor branch of the inductor. Alternatively, or in addition to this step, different quantities of heat can be introduced into the overlapping zone and the other edge zone of the bearing surface by the feature that the inductor branch associated with the overlapping zone is substantially inoperative in the zone in which it is at a smaller distance from the other inductor branch of the inductor.

In principle it is also possible that the inductor branch associated with the overlapping zone can be substantially constructed only in the portion of increased distance.

Also advantageously a guide shoe is associated with each free end of the inductor branches. Such supporting elements make it particularly simple to support the particular inductor on the bearing surface to be hardened, without incurring any risk that the bearing surface may become damaged.

As regards the construction of the device according to the invention, conveniently at least one of the inductor branches, but preferably both branches of each inductor are divided. This not only enables the electric connecting wires to approach and be taken away in an optimum manner, but it also enables at least one guide shoe to be disposed between the component portions of the inductors.

BRIEF DESCRIPTION OF THE DRAWINGS

The invention will now be explained in greater detail with reference to an embodiment thereof illustrated in the drawings, which show.

DETAILED DESCRIPTION OF THE INVENTION

Figure 1:
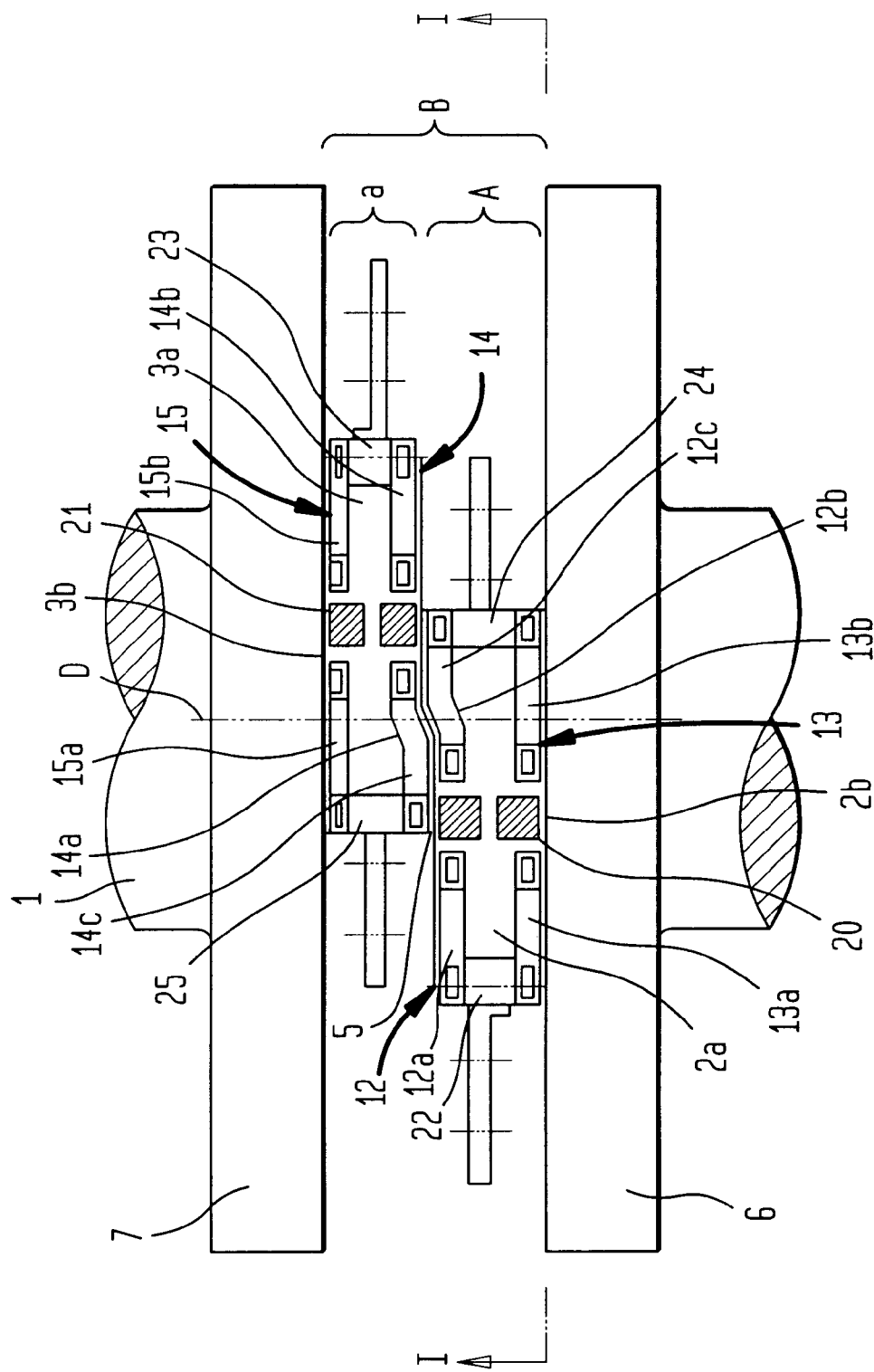
FIG. 1 a plan view of a detail of a first operational position of a crankshaft during heating in a device for the hardening of its bearing surface, FIG. 2 a frontal view of the operating position of the crankshaft shown in FIG. 1, sectioned along the line I—I in FIG. 1, and FIGS. 3a–3h a view, corresponding to a simplification of the view shown in FIG. 2, of different operational positions of the crankshaft during a rotation thereof.
Figure 2:
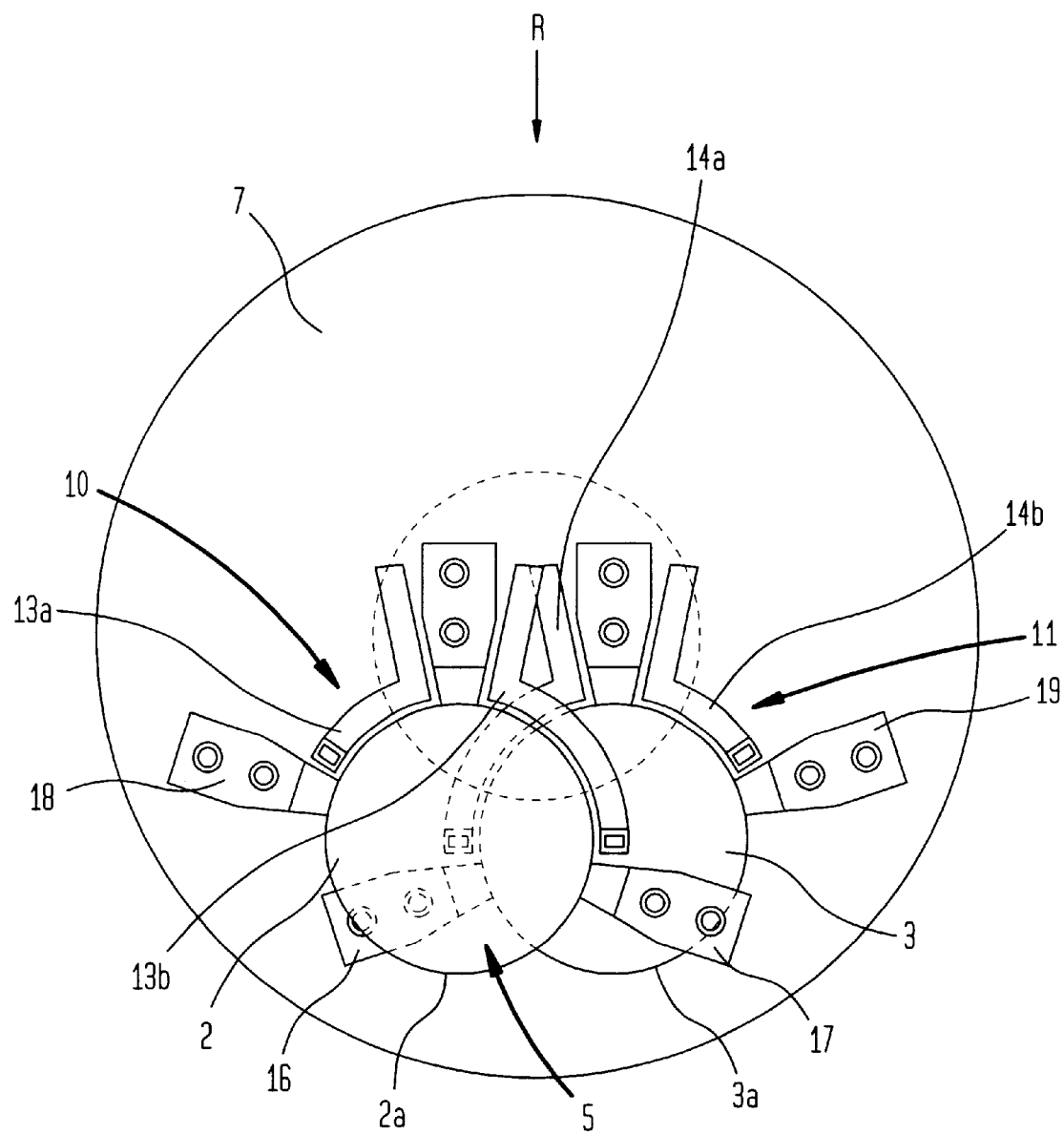

Referring to the drawings, a crankshaft 1 has a first crank pin 2 offset in relation to its axis of rotation D and having a bearing surface 2a. The first crank pin 2 immediately adjoins a second crank pin 3 which has a bearing surface 3a and is also disposed eccentrically in relation to the axis of rotation D of the crankshaft 1 and is also offset in relation to the first crank pin 2. A overlapping zone 5 in which the crank pins 3, 2 merge into one another is formed therebetween. Via their edge 2b, 3b opposite the overlapping zone 5 the bearing surfaces 2a, 3a each adjoin cheeks 6, 7 which have a substantially identical thickness and a considerably larger diameter than the diameter of the crank pins 2, 3.

To heat the bearing surfaces 2a, 3a of the crank pins 2, 3, inductors 10, 11 are applied from the same direction from above on to the crank pins 2, 3, each of the inductors 10, 11 being associated with one of the bearing surfaces 2a, 3a. The inductors 10, 11 each have two inductor branches 12, 13, 14, 15 which engage from the same direction R around the bearing surfaces 2a, 3a and are each divided into component branches 12a, 12b, 13a, 13b, 14a, 14b, 15a, 15b. Each of the inductor branches 12, 14 of the inductors 10, 11 is associated with the overlapping, zone 5, while the other inductor branch 13, 15 is associated with the other edge zone 2b, 3b of the bearing surface 2a, 3a associated with the cheeks 6; 7.

Via their first component portion 12b, 13b; 14a, 15a the inductor branches 12, 13; 14, 15 engage around the associated bearing surface 2; 3 by approximately 90°, while via their other portion 12a, 13a; 14b, 15b they each engage around the bearing surface 2a; 3a by a smaller angular amount. Guide shoes 16, 17, 18, 19 are disposed at each free end of the component portions of the inductor branches 12a, 12b, 13a, 13b, 14a, 14b, 15a, 15b. An additional pair of guide shoes 20, 21 is disposed centrally between the component portions 12a, 12b, 13a, 13b, 14a, 14b, 15a, 15b. Each of the component portions 12a, 13b; 12b 13$_b$ of the inductor branches 12, 13 and the portions 14a, 15a; 14b, 15b of the inductor branches 14, 15 are electrically connected to one another via connecting branches 22, 24; 25, 23.

The component portions 12b, 14a of each of the inductor branches 12, 14 of the inductors 10, 11 associated with the overlapping zone 5 each have a portion 12c, 14c which is disposed at a distance A from the particular other inductor branch 13, 15. The distance A is greater than the distance a between the other portions of the particular inductor branch 12; 14 and the particular other inductor branches 13, 15. The remaining portions in question are formed by the remaining part of the portions 12b, 14a and the particular second portion 12a, 14b. The portions 12c, 14c of the inductor branches 12, 14 each merge in an inclination into the remaining portion more closely adjacent to the particular other inductor branch 13, 15.

Figure 3A:
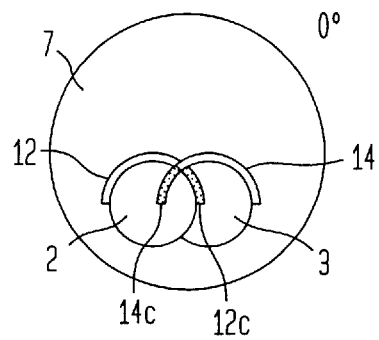
Figure 3B:
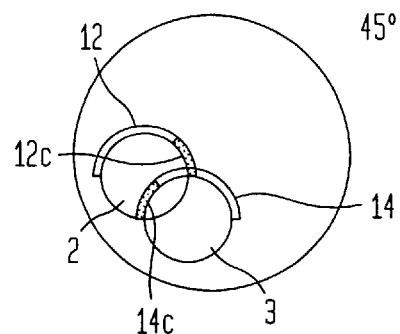
Figure 3C:
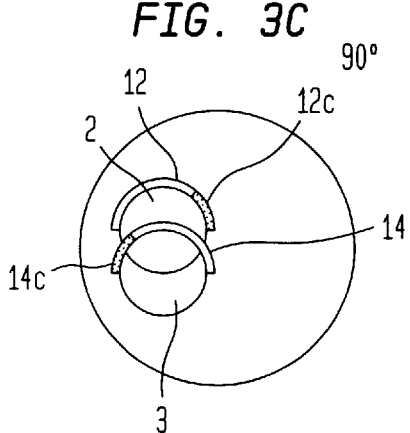
Figure 3D:
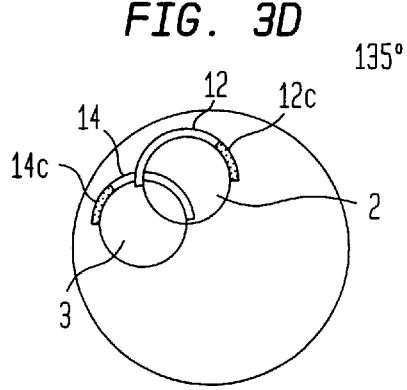
Figure 3E:
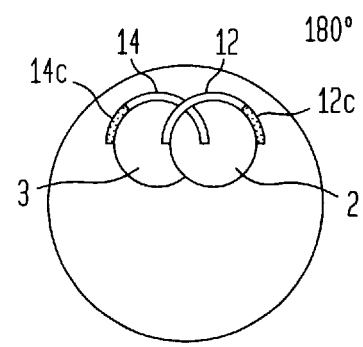
Figure 3F:
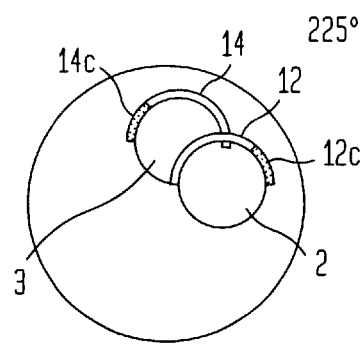
Figure 3G:
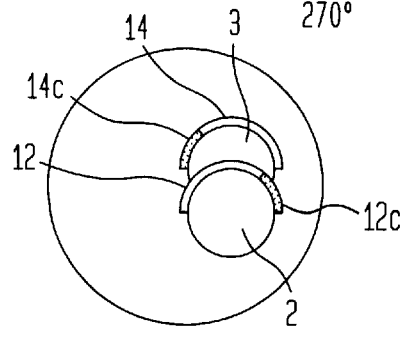
Figure 3H:
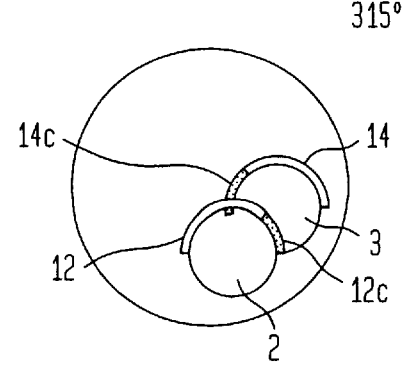

The distance A is such that the sum of the distances A of the two inductors 10, 11 is greater than the total width B of the bearing surfaces. By this dimensioning of the distance A, the portions 12c and 14c of the inductor branches 12, 14 overlap one another in the axial direction. The limit at which the portions 12c, 14c of increased distance A merge into the portion of smaller distance a corresponds to the limit of that zone of the inductor branches 12, 14 which, when the crankshaft 1 rotates, does not stand opposite the corresponding zone of the other inductor 14, 12 in the axial direction of the crankshaft in any rotational position thereof. The position of the portions 12c, 14c is made clear by FIGS. 3a–3h, which shows how the hatched portions 12c, 14c of increased distance A do not stand directly axially opposite one another viewed in the axial direction of the crankshaft 1, in any position of a rotation thereof.

In contrast with the component portions 12b, 13a, 13b of the branches 12, 13 of the inductor 10 and the component portions 14a, 15a, 15b of the branches 14, 15 of the inductor 11, the component portions 12a, 14b of the inductor branches 12, 14 are constructed unlaminated with sheet metal, so that they are substantially without effect in the heating of the bearing surfaces 2a, 3a. This prevents any overheating of the zones of the crank pins 2, 3 adjoining the overlapping zone 5.

At the same time, the fact that the length of the inductor branches 13, 15 associated with the cheeks 6, 7 which is effective as regards heating is greater than that of the inductor branches 12b, 14a operative in the overlapping zone 5 compensates for the higher heat transfer in the transitional zone between the cheeks 6, 7 and the adjoining crank pins 2; 3.

Alternatively to the embodiment shown in the drawings, the component portion 12a; 14b can also be connected directly to the outer end of the adjacent component portion 13a and 15b respectively of the inductor branch 13, 15 associated with the edge zone of the bearing surface 2a, 3a. It is also possible to completely eliminate the component portion 12a; 14b of the inductors 12, 14 associated with the overlapping zone 5 and to construct the inductor 12; 14 associated with the overlapping zone 5 only over the length of the portion 12c; 14c of increased distance A.

What is claimed is:

1. A device for the rotary and simultaneous electroinductive hardening of bearing surfaces of crank pins of a crankshaft comprises a plurality of inductors, each of said inductors having first and second inductor branches, wherein said crank pins are disposed adjacent to each other on said crankshaft and offset in relation to one another in an axial direction of said crankshaft, wherein portions of said adjacent crank pins form an overlapping zone, and wherein edges of said adjacent crank pins opposite said overlapping zone form an edge zone, each of said inductors engaging about said crank pins by up to a maximum of 180°, said first and second inductor branches being arranged in parallel to each other and following the curvature of said bearing surfaces of said crank pins, wherein said first inductor branch of a pair of said inductors is associated with said overlapping zone, wherein said second inductor branch of said pair of said inductors is associated with said edge zone, said first and second inductor branches include an increased distance A in said axial direction which is greater than half the total width of adjacent crank pins, wherein said pair of inductors engage around said crank pins from substantially the same direction, and wherein a zone of said increased distance A of said first and second inductor branches of a first of said pair of inductors is limited to a portion of said first inductor branch associated with said overlapping zone which does not, in any rotary position of said crankshaft, penetrate a corresponding portion of said first inductor branch of a second said pair of inductors.

2. The device of claim 1, wherein said first inductor branch is shorter than said second inductor branch.

3. The device of claim 1, wherein said first inductor branch is substantially inoperative in a zone in which it is at a small distance from said second inductor branch.

4. The device of claim 1, wherein said first inductor branch is constructed substantially only in a portion of said increased distance A.

5. The device of claim 1, wherein a portion of said first inductor branch which has an increased distance A is longer than its remaining portion.

6. The device of claim 1, wherein at least one guide shoe is associated with a free end of said first and second inductor branches.

7. The device of claim 6, wherein said at least one guide shoe is disposed between component portions of said pair of inductors.

8. The device of claim 1, wherein at least one of said first and second inductor branches is divided.

* * * * *